UNITED STATES PATENT OFFICE.

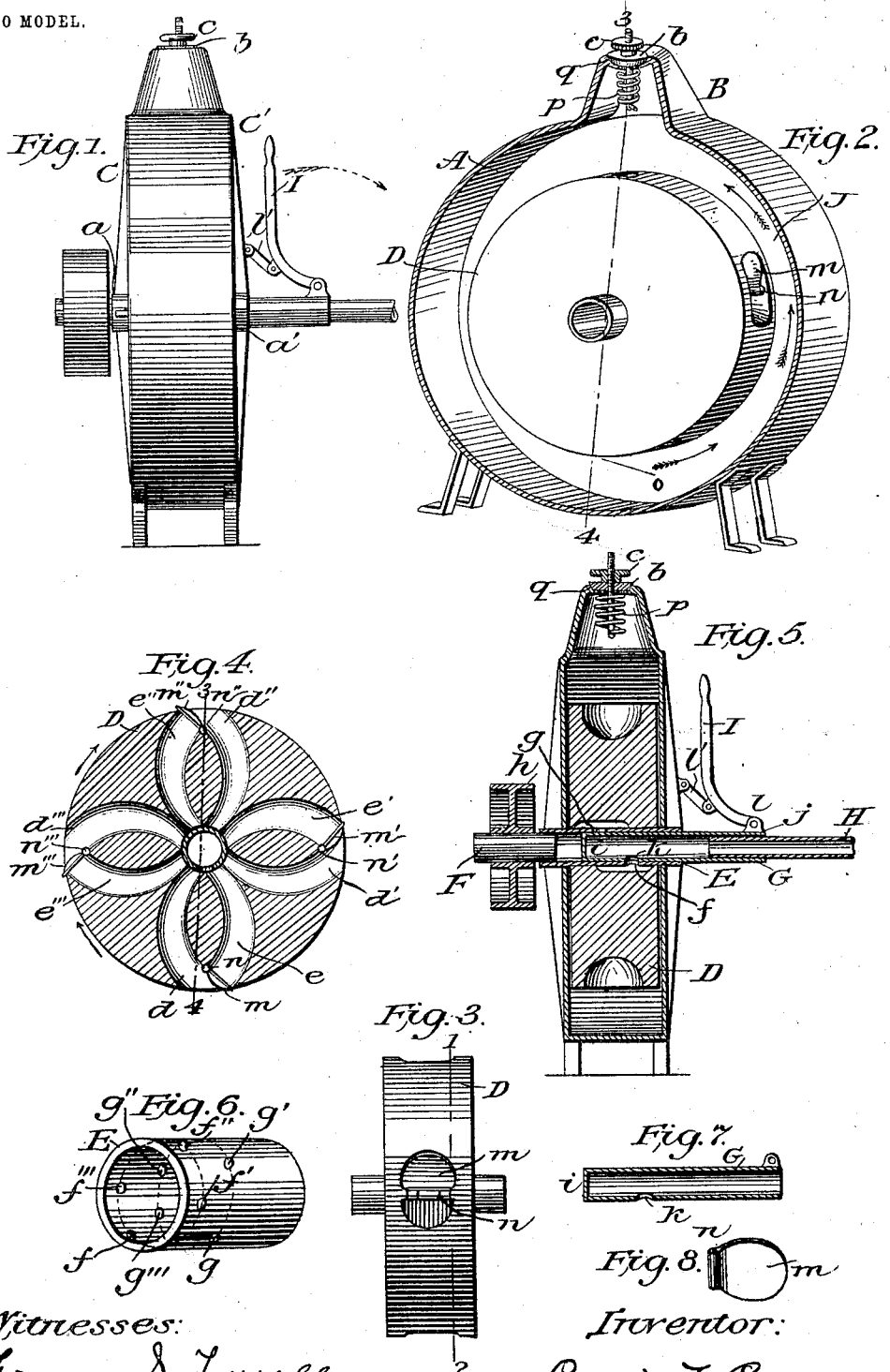

EDWIN T. CASS, OF WHITEWATER, WISCONSIN.

ROTARY ENGINE.

SPECIFICATION forming part of Letters Patent No. 719,302, dated January 27, 1903.

Application filed June 5, 1902. Serial No. 110,388. (No model.)

*To all whom it may concern:*

Be it known that I, EDWIN T. CASS, a citizen of the United States, residing at the city of Whitewater, in the county of Walworth and State of Wisconsin, have invented a new and useful Engine, of which the following is a specification.

My invention relates to rotary engines; and the objects thereof are to provide a machine which will utilize the maximum force of expanding steam, air, or any suitable gas and in which all of the parts will work together with the minimum of friction.

In steam and pneumatic rotary engines it is almost impossible to make joints which will wear and expand evenly and always be tight enough to obtain a large percentage of the power employed without incurring a great waste through friction, while in hydraulic engines close joints are not required and a large percentage of the power employed is transmitted with but a small loss from friction. In my invention, therefore, I combine these two forces in such a manner that steam, air, or any suitable gas exerts its expansive force upon a small body of water or any other suitable liquid which is continuously employed in utilizing such expansive force for the purpose of obtaining rotary motion and power, as illustrated in the accompanying drawings, in which—

Figure 1 is a perspective view of the exterior of the complete machine; Fig. 2, a perspective view of the interior of the machine; Fig. 3, a perspective view of the reversible turbine-wheel. Fig. 4 is a section of the reversible vertical turbine-wheel cut across the hub on the dotted line 1 2, Fig. 3, showing the interior reverse curved channels with their openings to the hub and at the circumference of the wheel and the automatic valves, which always close one set of the channels at their circumference-openings. Fig. 5 is a section of the entire machine cut nearly vertical and lengthwise of the hub a little off the center on the dotted line 3 4, Figs. 2, 4. Fig. 6 is an enlarged perspective view of the hub. Fig. 7 is a vertical section of the feed-valve, and Fig. 8 a perspective view of one of the automatic valves.

Similar letters refer to similar parts throughout the several views.

The frame of the machine is a hollow case and consists of a cylindrical rim A, opening at the top into a dome B and closed at each end by heads C C', having central bearings $a$ $a'$ for the turbine. The dome B has an orifice at the top closed by an upward-opening spring-valve $b$, the pressure of which can be increased or diminished by the screw and nut $c$. The reversible vertical turbine D is supported by the ends of its hub E resting in the bearings $a$ $a'$ and revolves in either direction. It consists of a wheel having two reversed sets of interior curved channels $d$ $d'$ $d''$ $d'''$ and $e$ $e'$ $e''$ $e'''$, starting on different circles in its hub E and opening at the same places at the circumference. One set of channels, $d$ $d'$ $d''$ $d'''$, has openings $f$ $f'$ $f''$ $f'''$ around a circle near one end of the hub E and turns the wheel in one direction. The other set of channels, $e$ $e'$ $e''$ $e'''$, has openings $g$ $g'$ $g''$ $g'''$ around a circle near the other end of the hub E and turns the wheel in the opposite direction. One end of the hub E is closed by the shaft F, having a pulley $h$ or any suitable gear to communicate power. The other end of the hub E is closed by the feed-valve G, which is a tube closed at one end $i$, which fits into the hub E, with any suitable packing to make close joints, and open at the other end $j$, which fits over the end of the feed-pipe H and having an opening K on the under side which communicates with one set of the curved channels of the turbine to revolve the wheel in one direction and with the other set to revolve it in the other direction. The reversing-lever I is fastened to the valve G by a hinge $l$ and to the frame of the machine by a link-hinge $l'$. When the lever I stands upright, as shown in the drawings, the valve G is drawn out, so that the opening K communicates with the curved channels $d$ $d'$ $d''$ $d'''$ at $f$ $f'$ $f''$ $f'''$, and when it is turned down, as indicated by the dotted line in Fig. 1, the valve G is pushed in, so that the opening K communicates with the curved channels $e$ $e'$ $e''$ $e'''$ at $g$ $g'$ $g''$ $g'''$ and the turbine is reversed. The automatic valves $m$ $m'$ $m''$ $m'''$ are made to fit either set of the curved channels of the turbine where they come together near the circumference and are hinged to the dividing-cores at $n\,n'\,n''\,n'''$, so that they will swing either way and close the outward openings of either of the sets of curved channels.

The curved channels in the turbine and all of the space about the wheel inside of the frame or case are filled with a liquid J, which extends upward to the lower part of the dome B. Water, oil, mercury in liquid form, or any other suitable liquid may be used for this purpose.

Steam, air, or any suitable gas under pressure may be used for working the engine herein described; but as the operation is similar in each case I will only describe its use with steam.

The feed-pipe H is connected with a boiler, and steam under pressure passes through it into the feed-valve G and thence down through the opening K through one of the openings $f\,f'$, &c., into the top of whichever one of the curved channels $d\,d'$, &c., then happens to be nearest the bottom of the wheel, the opening K being of such size that it will always partially coincide with one of the openings $f\,f'$, &c., when the lever I is turned up. We will suppose the curved channel $d$, Fig. 4, is nearest the bottom of the wheel D at the time of starting. The steam entering the top of $d$ forces the fluid J downward in the channel, closing the opening of $e$ with the automatic valve $m$ and out of the circumference-opening on the tangent line $o$ until it strikes the inside of the rim A and is turned upward toward the dome B, as indicated by the arrows, Fig. 2, and the wheel revolves in the opposite direction, as indicated by the arrows, Fig. 4, carrying $d$ toward $d'''$ and $d'$ into the former position of $d$. As the wheel revolves steam is cut off from $d$ and admitted to $d'$ and successively to each of the curved channels in the set $d\,d'$, &c., as it comes beneath the opening K. After the steam is cut off it continues to expand, forcing the liquid out of the channels $d\,d'$, &c., until midway between $d'''$ and $d''$ is reached, when the steam escapes upward through the liquid into the dome B and the liquid rushes into the channel, filling the space occupied by the escaping steam. This inflow of the liquid gives an additional impetus to the wheel, and after each channel passes the position of $d''$, Fig. 4, the force of gravitation is also utilized in the continuous revolving of the wheel, the channels on the one side always being filled with liquid, making that side heavier than the other where the channels are partially filled with steam. After the steam escapes into the dome B it exerts a downward pressure on the liquid and an upward pressure on the spring-valve $b$ until the power of the spring $p$ is overcome and the valve $b$ is opened, permitting the steam to exhaust through the orifice $q$, Fig. 5. By turning the nut $c$ the downward pressure of the steam in the dome B can be regulated and adjusted to the upward pressure of the fluid, so as to secure the best results in the work of the engine.

The engine is reversed by turning the lever I down, as indicated by the dotted lines, Fig. 1. This forces the valve G into the hub E, closing $f\,f'$, &c., and bringing K in line and communication with $g\,g'$, &c., and admitting steam into the channels $e\,e'$, &c., which forces the fluid out, turning the automatic valves $m\,m'$, &c., so as to close the channels $d\,d'$, &c. The machine is now completely reversed, and as the force continues the turbine D revolves in the opposite direction from which it did before.

As the same liquid is continuously used in this engine, it soon becomes heated to a point approaching the temperature of the steam, air, or gas, whichever is being used, so that the same is not condensed or contracted by contact with the fluid. If desired, the liquid may be dispensed with and the engine operated entirely by steam, air, or gas, in which case a high rate of speed and considerable power may be obtained by turning the nut $c$ on the valve $b$, so as to produce sufficient resistance from the exhaust for the outward pressure from the turbine to work against. It may also be used as a reversible water-motor, in which case water under pressure is admitted through the feed-pipe H and passes through the turbine and out at the exhaust.

Other mechanical devices may be employed to produce results substantially the same as this engine, and therefore I do not confine my invention to the particular machine herein described, but may use any combination of mechanical parts which will work together in a similar manner.

Having thus described my invention, what I claim as new, and desire to secure by Letters Patent, is—

1. The automatic valves $m$, for a reversible turbine-wheel, substantially as herein described.

2. The combination in an engine of the hollow frame, consisting of the rim A, the dome B, and heads C C'; the reversible turbine D; the exhaust-valve $b$; the feed-valve G; the hub E; the shaft F; and fluid J; all substantially as herein set forth and described, for the uses and purposes herein mentioned.

3. The combination in a turbine-wheel of two sets of reversed curved channels having feed-ports on different circles near the center and opening at the same places at the circumference, substantially as herein shown.

4. An outward and inward flow turbine-wheel combined with a body of liquid which is forced out of and into the channels of the wheel by steam, air or gas, substantially as herein described.

5. The combination in a rotary engine of a turbine-wheel with an inclosing frame or case having an elastic or spring exhaust-valve, substantially as herein described.

6. The combination in a reversible turbine-wheel of two sets of curved channels with an automatic valve for their circumference-openings, substantially as herein described.

7. In a rotary engine, the combination of a turbine-wheel with a central feed-valve through which steam, air or any gas under pressure escapes downward upon a liquid in the channels of the wheel, substantially as herein set forth.

In testimony whereof I have signed my name to this specification in the presence of two subscribing witnesses.

EDWIN T. CASS.

Witnesses:
JENNIE A. COLEMAN,
FRANCES S. TYRRELL.